United States Patent
Blachek et al.

[11] Patent Number: 5,880,899
[45] Date of Patent: Mar. 9, 1999

[54] REMOVAL OF RAISED IRREGULARITIES ON A DATA STORAGE DISK WITH CONTROLLED ABRASION BY A MAGNETORESISTIVE HEAD

[75] Inventors: Michael David Blachek; Gordon James Smith, both of Rochester, Minn.

[73] Assignee: International Business Machines Corporation, Armonk, N.Y.

[21] Appl. No.: 810,154

[22] Filed: Feb. 25, 1997

[51] Int. Cl.⁶ .............. G11B 5/03; G11B 21/02; G11B 5/127
[52] U.S. Cl. .............. 360/66; 360/75; 360/113
[58] Field of Search .............. 360/31, 53, 75, 360/46, 103, 113, 66, 73.03

[56] References Cited

U.S. PATENT DOCUMENTS

| | | | |
|---|---|---|---|
| 4,375,657 | 3/1983 | Brock et al. | 360/125 |
| 4,845,816 | 7/1989 | Nanis | 29/90.01 |
| 4,907,106 | 3/1990 | Yamada | 360/75 |
| 5,025,341 | 6/1991 | Bousquet et al. | 360/120 |
| 5,063,712 | 11/1991 | Hamilton et al. | 51/67 |
| 5,351,156 | 9/1994 | Gregory et al. | 360/74.1 |
| 5,412,518 | 5/1995 | Christner et al. | 360/66 |
| 5,436,776 | 7/1995 | Kurokawa | 360/103 |
| 5,455,730 | 10/1995 | Dovek et al. | 360/66 |
| 5,461,521 | 10/1995 | Ito et al. | 360/75 |
| 5,527,705 | 6/1996 | Abraham et al. | 360/75 |
| 5,530,705 | 6/1996 | Malone, Sr. | 371/5.1 |
| 5,696,643 | 12/1997 | Tsuwako et al. | 360/75 |
| 5,754,355 | 5/1998 | Nakamura et al. | 360/75 |
| 5,777,815 | 7/1998 | Kasiraj et al. | 360/69 |

FOREIGN PATENT DOCUMENTS

| | | | |
|---|---|---|---|
| 58-57633 | 10/1981 | Japan | G11B 5/84 |
| 59-168969 | 3/1983 | Japan | G11B 17/32 |
| 61-156525 | 12/1984 | Japan | G11B 5/84 |
| 1-185833 | 1/1988 | Japan | G11B 5/84 |
| 4-113516 | 4/1992 | Japan . | |
| 5-28472 | 2/1993 | Japan . | |

*Primary Examiner*—Andrew L. Sniezek
*Assistant Examiner*—Regina Y. Neal
*Attorney, Agent, or Firm*—Dan Hubert; Mark A. Hollingsworth; Matthew J. Bussan

[57] ABSTRACT

Raised irregularities in a magnetic data storage disk are removed by contacting an MR head with the relatively softer irregularity to abrasively erode the irregularity. The MR head may be brought into contact with the irregularity, for example, by selectively increasing read bias current of the head to expand the head toward the disk. Advantageously, removal of such imperfections helps eliminate thermal asperities created when the head inadvertently contacts raised irregularities during reading of data.

54 Claims, 4 Drawing Sheets

REMOVAL OF RAISED IRREGULARITIES ON A DATA STORAGE DISK WITH CONTROLLED ABRASION BY A MAGNETORESISTIVE HEAD

BACKGROUND OF THE INVENTION

1. Field of the Invention

The present invention relates to magnetic data storage drives with head disk assemblies utilizing magnetoresistive ("MR") heads. More particularly, the invention concerns a method, apparatus, and programmed product for removing raised irregularities in a magnetic data storage disk by contacting an MR head with the relatively softer irregularity to abrasively erode the irregularity. The MR head may be expanded, for example, by selectively increasing read biasing current to the MR head.

2. Description of the Related Art

One of the most important components in a magnetic disk drive system is the read/write head. A conventional read/write head operates by sensing the rate of change of magnetic flux transitions stored on the surface of a magnetic disk. The read/write head produces an electrical output signal in response to the sensed magnetic flux transitions. The read/write head's output signal is velocity dependent— a faster disk speed yields a greater magnitude output signal.

MR heads represent an important improvement in magnetic disk drive systems. The output signal of an MR head is not dependent on the relative velocity between the head and the disk. Instead of simply sensing a magnetic field from the disk surface, an MR head senses the rate of change of that field. MR heads may employ a similar write element as a conventional head. However, an MR head uses a modified read element employing new features such as a thin sensing element called an "MR stripe".

This MR stripe operates based upon the magnetoresistive effect. Namely, the resistance of the MR stripe changes in proportion to the magnetic field of the disk, passing by the MR stripe. If the MR stripe is driven with a constant current, the MR stripe's voltage drop is proportional to its resistance. Thus, the MR stripe's voltage represents the magnetic signals encoded on the disk surface. In other arrangements, a constant voltage is applied to the MR stripe, and the resultant current is measured to detect magnetic signals stored on the disk surface.

Although highly beneficial, MR heads are especially susceptible to certain errors. Namely, the resistance of the MR stripe varies in response to heating and cooling of the MR stripe, in addition to the magnetic flux signals encoded on the disk surface. Normally, the MR stripe maintains a constant temperature as it flies over the disk surface, separated by a thin cushion of air created by the rapidly spinning disk. In this state, the stored magnetic flux signals contribute most significantly to the MR stripe's output signals, as intended. An MR stripe, however, may experience heating under certain conditions, especially when the MR head inadvertently contacts something.

Contact with MR head may occur in a number of different ways. For instance, the MR head may contact a raised irregularity in the disk surface, such as a defect in the material of the disk surface or a contaminant such as a particle of dust, debris, etc. Also, the MR head may contact the disk surface during a high shock event, where G-forces momentarily bounce the MR head against the disk surface. Such contact results in heating of the MR head, including the MR stripe. Heating of the MR stripe increases it resistance, which distorts the MR stripe's output signal. This type of distortion is known in the art as a "thermal asperity." A read channel in a magnetic disk drive, however, is designed to receive a reliable signal from the MR head, free from irregularities such as thermal asperities. Consequently, severe thermal asperities may prevent the read channel from correctly processing output signals of the MR head, causing a channel error.

These errors may be manifested in a number of different ways. For instance, severe distortions of the channel signal may cause the magnetic disk drive to shut down. Other errors may simply prevent reading of data on the disk. Such errors may also prevent writing of data, if the servo signal embedded in the disk cannot be read correctly, or it indicates that the head is too far off track to write data without overwriting data on an adjacent track. This condition is called a "write inhibit error". If errors of this type persist, the disk drive may deem the entire sector "bad", causing a write inhibit "hard" error. Repeated thermal asperities may also cause a disk drive to fail a predictive failure analysis measure, falsely signalling an impending disk failure to the disk drive user.

As shown by the foregoing, then, thermal asperities in magnetic disk drive systems can be significant problems in disk drives that use MR heads.

SUMMARY OF THE INVENTION

Broadly, the present invention concerns the removal of raised irregularities in a magnetic data storage disk by bringing an MR head into contact with the relatively softer irregularity to abrasively erode the irregularity. The raised irregularity may be part of the disk itself, such as a manufacturing anomaly, or a foreign material such as dust or another contaminant. The MR head may be brought into contact with the irregularity, for example, by selectively increasing read biasing current to the MR head to expand the head toward the disk. Accordingly, one embodiment of the invention involves a method to remove irregularities from a magnetic disk surface.

In another embodiment, the invention may be implemented to provide a magnetic disk storage apparatus, configured to remove irregularities from a magnetic disk surface. Moreover, still another embodiment is contemplated, providing a programmed product comprising signal-bearing media embodying a program of machine-readable instructions executable by a digital data processing apparatus to perform method steps for removing irregularities from a magnetic disk surface.

The invention affords its users with a number of distinct advantages. Chiefly, the invention removes raised storage surface irregularities, helping to avoid thermal asperities that would otherwise be created when the head inadvertently contacts such irregularities during reading of servo information or user data. Thus, the invention helps to more accurately read data with an MR head. Advantageously, the invention may be implemented using a typical MR head, avoiding the need for specialized burnishing heads. The invention provides these and other advantages, as described in greater detail below.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections
Magnetic Data Storage System

Figure 1:
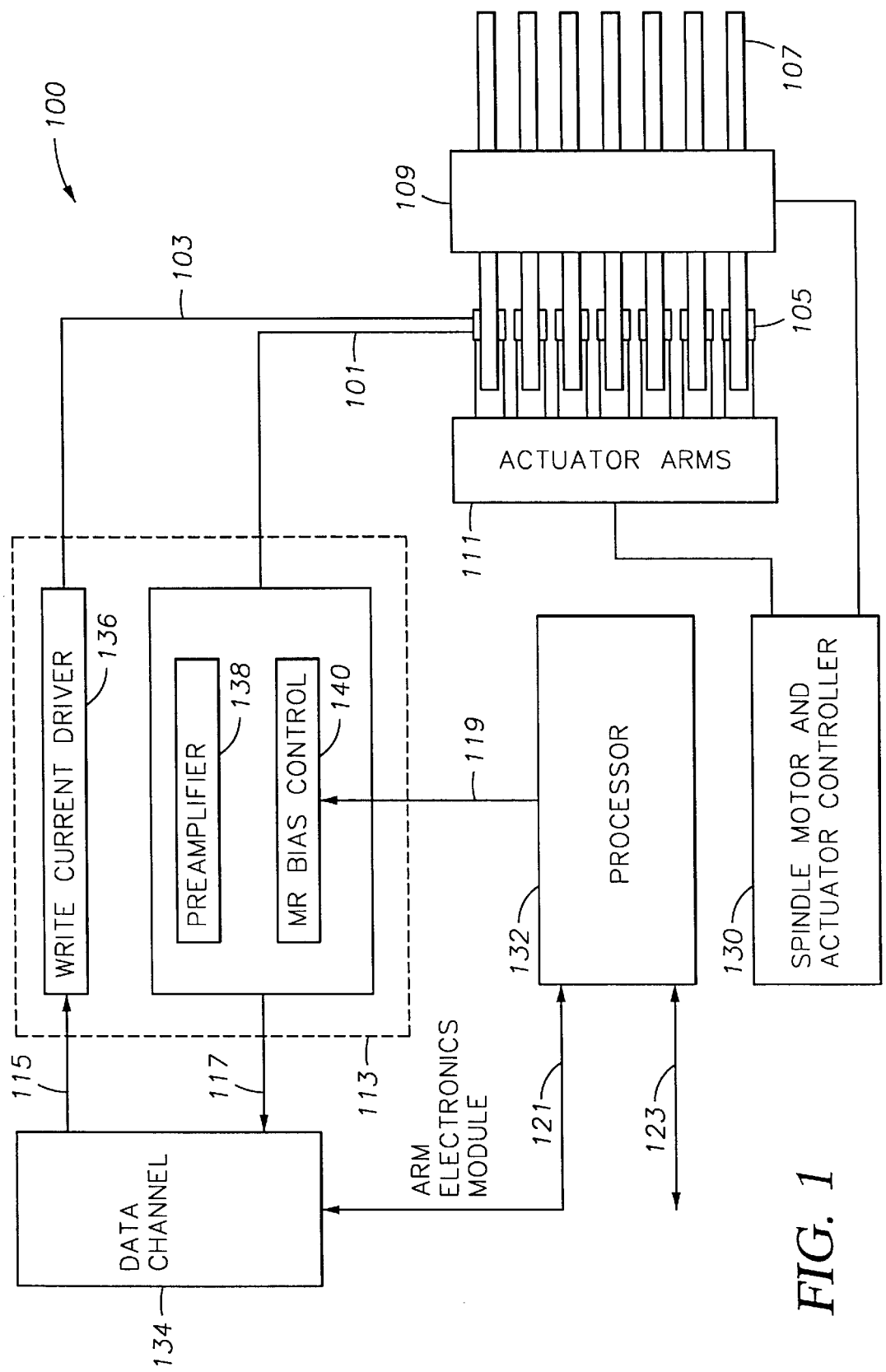
FIG. 1 is a diagram of the hardware components and interconnections of a magnetic disk storage system in accordance with the invention.

One aspect of the invention concerns a magnetic data storage system 100, which may be embodied by various hardware components and interconnections as described in FIG. 1. As an example, the system 100 may be embodied in an IBM model 86G9124 disk drive (called "Ultrastar"), which is a 3.5 inch, 2.0 Gigabyte disk drive used by the IBM® AS/400® machine. IBM AS/400 are both registered trademarks of International Business Machines Corporation.

The system 100 includes a number of recording/playback heads 105, mounted proximate to a like number of disks 107. The disks 107 are centrally mounted to a spindle 109, which is rotatably driven by a spindle motor (not shown). The recording/playback heads 105 are attached to one or more actuator arms 111, which radially position the heads 105 with respect to tracks (not shown) on the disks 107.

A spindle motor and actuator controller 130 provides control of the spindle motor and actuator arm 111. Each recording/playback head 105 includes read and write elements (not shown), which are described in greater detail below. The read and write elements are coupled to an arm electronics module 113, which includes a number of different subcomponents. A write current driver 136 which is coupled to the write elements by an electrical connection 103, provides a write current to the write element of the appropriate read/playback head 105 when writing data to one of the disks 107. Write source data comes from a data channel 134, by way of an electrical connection 115. The data channel 134 is managed by a processor 132 coupled to the data channel 134 by an interface 121. The processor 132 may comprise, for example, a microprocessor or another suitable digital data processing apparatus.

The module 113 also includes read subcomponents, including an MR bias control unit 140 and a preamplifier 138, both coupled to the read elements by an electrical connection 101. The MR bias control unit 140 supplies a read bias current to the MR read element of the appropriate read/playback head 105 when reading data from one of the disks 107. The MR bias current is regulated by control signals received from the processor 132 over a connection 119. Signals containing data read from the disks 107 are amplified by the preamplifier 138 and then sent to the data channel 134 over the connection 117. Using the connection 117, the processor 132 manages the data channel's reading of data.

The processor 132 also includes an interface 123, to exchange control signals with a host device (not shown) such as a personal computer, disk controller, mainframe computer, etc.

Read/playback Heads

Figure 2:
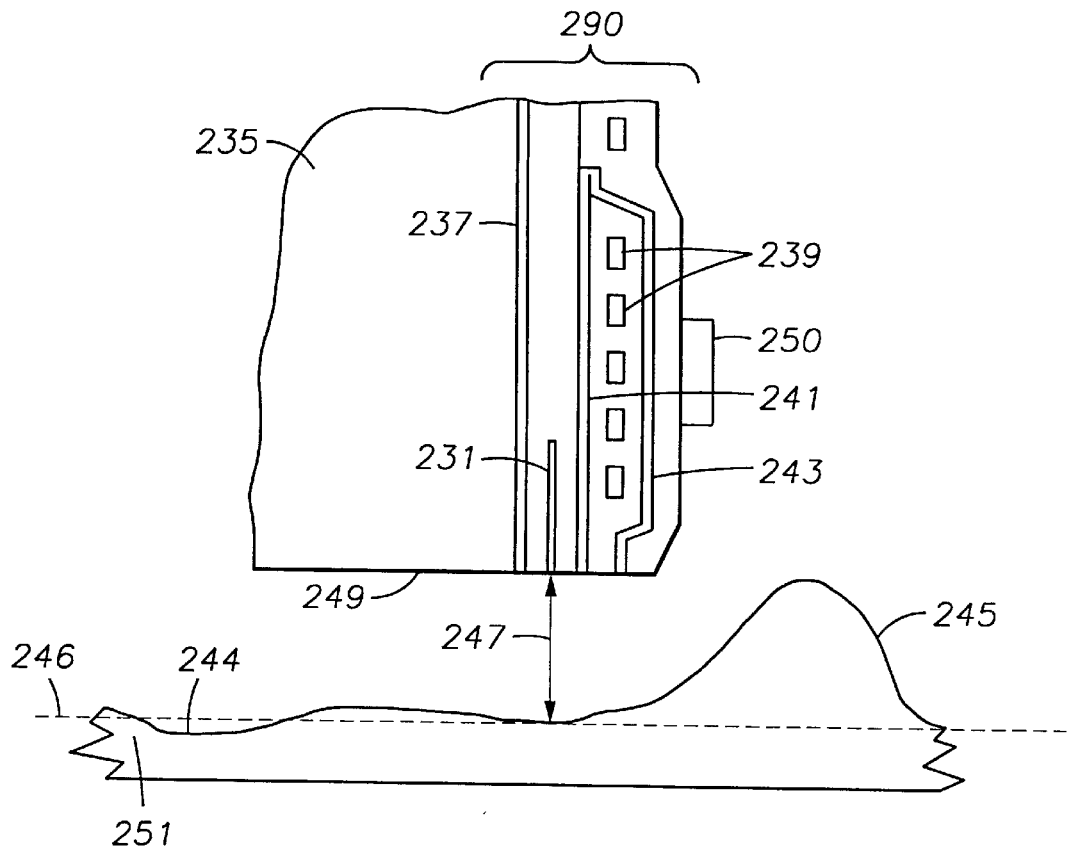
FIG. 2 is a side cutaway diagram of a MR head and a magnetic data storage disk.

FIG. 2 shows additional detail concerning the structure of an exemplary one of the read/playback head 290 in relation to a magnetic disk 25 1. The head 290 may represent any one of the heads 105, while the disk 251 may represent any one of the disks 107. The read/playback head 290 used by the invention may employ a known or novel head configuration, depending upon the needs of the application. Preferably, the head 290 is supported on a deposit end of a slider 235. The slider 235 includes an air bearing, surface 249.

The head 290 includes an MR read element 231 ("stripe"), layered between a pair of magnetic shields 237, 241. Behind the shield 241 lies an inductive recording element comprised of windings 239, and pole pieces 243/241.

The air bearing surface 249 flies at a controlled flying height 247 above the surface 244 of the magnetic disk 251. Ideally, the surface 244 has an optimally flat elevation 246. However, due to manufacturing irregularities, and/or the presence of contaminants such as dust, the surface may include raised irregularities 245 that protrude above the optimally flat elevation 246. As explained above, extreme irregularities may result in a collision between the head 290 and the disk 251. Such collisions significantly heat the sensitive MR stripe 231, introducing errors into the read signals generated by the MR stripe 231.

Preferably, the slider 235 is made from a hard ceramic material, such as $AlO_2$, $TiC/Al_2O_3$ (known as "N58"), silicon carbide, or zirconium oxide, or a non-ceramic material such as silicon. Non-conductive components of the head 290 may be formed from alumina or another suitable material, whereas the conductive components may be made of a magnetic material such as iron-nickel combination or another appropriate material. Preferably, the slider 235 and head 290 are coated with a uniform overlayer (not shown), such as a carbonbased material, to protect the head 290 and slider 235 from wear, contamination, and damage. In accordance with the invention, material of the head 290 is -preferably harder than material of the disk 251 as well as contaminants and other materials on the disk 251 that may cause thermal asperities.

Preferably, the head 290 also includes a selectively activated heating element 250 for heating the head 290. The heating element 250 may comprise, for example, a carbon film resistive material such as a thin film resistor, surface mount resistor or nichrome wire coil to evenly heat the head 290. Alternatively, the heating element 250 may comprise another heat generating means employing electrical, mechanical, chemical, or other suitable heat generating components and techniques. By heating the head 290, the heating element 250 causes the head 290 to expand and thus protrude toward the disk 251.

OPERATION

In addition to the various hardware embodiments described above, a different aspect of the invention concerns a method for operating an MR head to remove raised irregularities on the surface of a magnetic data storage disk.
Signal-Bearing Media Such a method may be implemented, for example, by operating the data storage system 100 to execute a sequence of machine-readable instructions. These instructions may reside in various types of signal-bearing media. In this respect, another aspect of the present invention concerns a programmed product, comprising signal-bearing medium embodying a program of machine-readable instructions, executable by a digital data processor to perform method steps to remove raised irregularities from a magnetic data storage disk.

Figure 3:
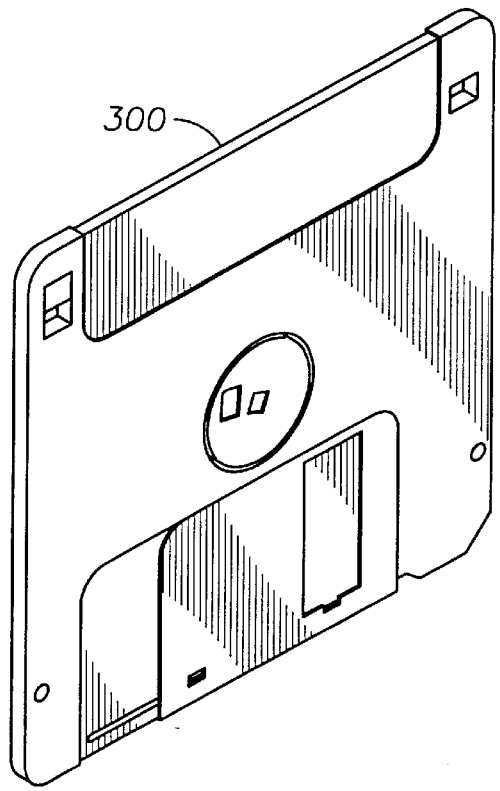
FIG. 3 is a programmed product in accordance with the invention.

The signal-bearing media may comprise, for example, RAM contained within the processor 132 or arm electronics module 113. Alternatively, the instructions may be contained in other signal-bearing media such as one or more magnetic data storage diskette 300 (FIG. 3), DASD storage (e.g., a conventional "hard drive" or a RAID array), magnetic tape, electronic read-only memory (e.g. ROM), optical storage device (e.g. CDROM or WORM), paper "punch" cards, or other signal-bearing media including transmission media such as digital and analog and communication links and wireless. In an illustrative embodiment of the invention, the machine-readable instructions may comprise lines of compiled "C" language code.

Overall Sequence of Operation

Figure 4:
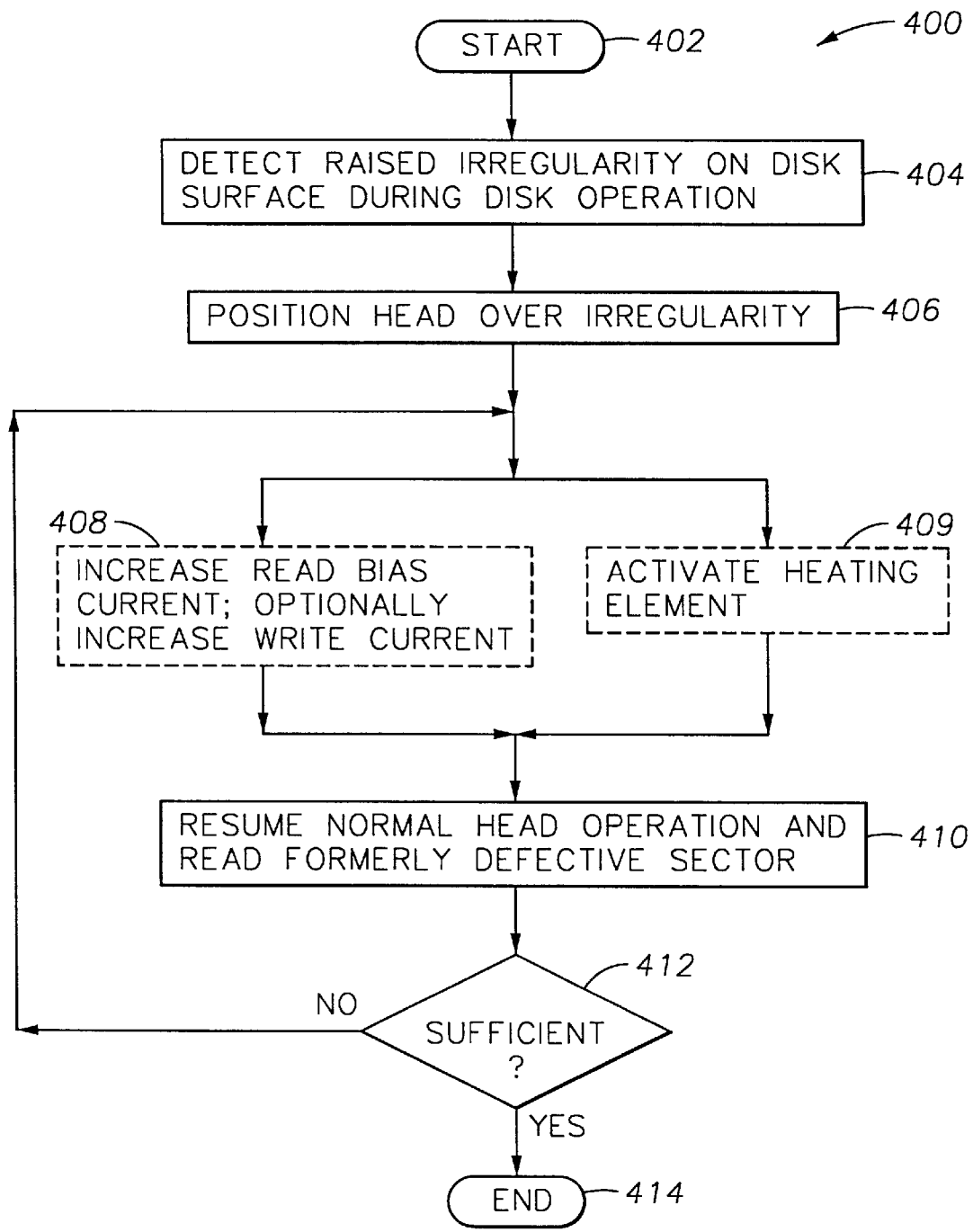
FIG. 4 is a flowchart illustrating a sequence of method steps to remove raised irregularities on a magnetic data storage disk in accordance with the invention.

FIG. 4 shows a sequence of method steps 400 to illustrate one example of the method aspect of the present invention. For ease of explanation, but without any limitation intended thereby, the sequence 400 is described in the context of the magnetic data storage system 100 and read/playback head 290 described above.

After the steps 400 are initiated in task 402, the processor 132 in task 404 detects an irregularity on the surface 244 of the disk 251. As an example, the irregularity may be present in user data stored on the disk 251, or in servo data stored on the disk 251. In one embodiment, the irregularity may be found by detecting a thermal asperity in a read (or servo) signal output by the data channel 134. To aid in locating the irregularity, the system 100 may also reference an "error log", which is a record listing errors occurring in the system 100.

Figure 5:
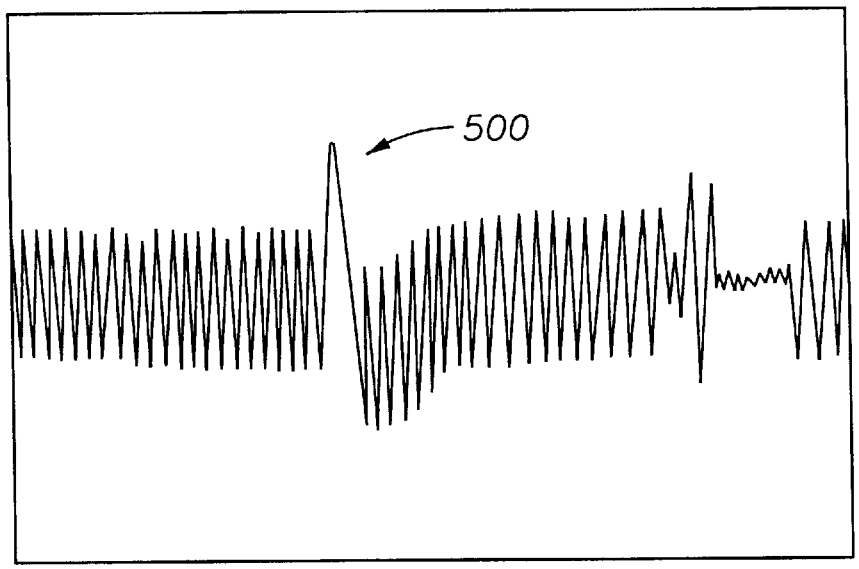
FIG. 5 is a diagram of a signal created by reading data stored on a magnetic data storage disk, where the signal includes thermal asperity caused by unintended contact between the read/playback head and a raised irregularity of the disk surface.
Figure 6:
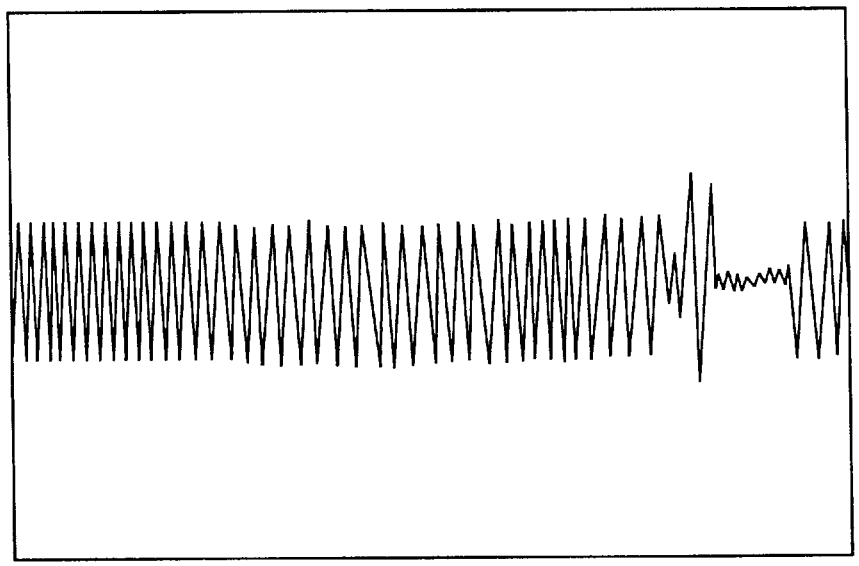
FIG. 6 is a diagram of a signal created by reading the same location on the disk as read in FIG. 5, after the removal of the thermal asperity in accordance with the invention.

FIG. 5 shows an exemplary read signal containing a thermal asperity 500. In contrast, FIG. 6 illustrates a read signal corresponding to the same disk location, with the thermal asperity 500 having been removed in accordance with the invention. The shape of a typical thermal asperity is therefore revealed by comparing FIGS. 5–6. To identify such a thermal asperity in task 404, predefined criteria may be applied to signals of the data channel 134. Such criteria, for example, may include evaluation of the read signal against a maximum amplitude, maximum frequency, predetermined signal shape, and/or other signal characteristics.

Having detected a raised irregularity in task 404, the spindle motor and actuator controller 130 cooperate in track 406 to position the read/playback head 290 over the track containing the detected irregularity. After task 406, the head 290 is brought into contact with the irregularity 245 to abrasively remove the irregularity 245. This may be performed in a number of different ways.

As one example, the MR bias control unit 140 may increase the read bias current sufficiently for the head 290 to increase its contact with the irregularity 245, as shown by task 408. It is believed that sufficiently increasing the read bias current causes an increase in head temperature, resulting in a protrusion of the head 290 toward the disk 251.

In the IBM Ultrastar disk drive, for example, this may be achieved by raising the read bias current from 10 milliamps to 17 milliamps. This causes a head protrusion of about 5–10 nanometers. Contact between the head 290 and the irregularity 245 has the effect of abrasively burnishing the irregularity 245 each time rotation of the disk 251 brings the irregularity past the head 290. This is because the head 290 is relatively harder than the irregularity 245, as discussed above.

The increased read bias current is preferably maintained for a sufficiently long time to permit the head 290 to heat, and then for multiple revolutions of the disk 107 to occur. For example, the increased read bias current may be maintained for about 5 seconds.

It may also be advantageous during task 408 to engage the write current driver 136 to increase the head's write current, as if performing a write operation. This further heats the head 290, beyond the heating caused by the increased read bias current. And, further heating of the head 290 causes the head 290 to further protrude toward the raised irregularity 245. In some cases it may be desirable to avoid the write current driver 136, however, to avoid overwriting any valuable data residing on the disk 251.

As an alternative to task 408, or as an enhancement thereto, task 409 may be performed to raise the temperature of the head 105 using the heating element 250. Similar to task 408, this causes a small but significant head protrusion bringing the head 290 into contact with the irregularity 245, abrasively burnishing the irregularity 245 each time rotation of the disk 251 brings the irregularity 245 past the head 290.

Following task 408, the read bias current is returned to normal levels, and the defective sector is read again. Query 412 then determines whether the burnishing of task 408 was sufficient to remove the detected irregularity. If not, tasks 408/410 are repeated. Otherwise, having removed the irregularity, query 412 proceeds to task 414, where the sequence 400 ends.

Enhancing Techniques

If desired, the operation of the sequence 400 may be enhanced in a number of ways. For example, during task 408 when the read bias current is boosted, the head 290 may be directed to increase its burnishing action by shifting off-track, moving from side-to-side. Another technique to enhance the burnishing action of task 408 involves heating the disk 251 containing the raised irregularity, causing the irregularity to protrude toward the head. In addition to the enhancement of task 408 with the foregoing techniques, it is contemplated that one or more of these techniques may be used instead of increasing the head bias current in suitable applications. Moreover, a wide variety of other techniques or components for heating the head 290 and/or disk 251 may be employed without departing from the purview of the present invention.

OTHER EMBODIMENTS

While there have been shown what are presently considered to be preferred embodiments of the invention, it will be apparent to those skilled in the art that various changes and modifications can be made herein without departing from the scope of the invention as defined by the appended claims. For example, although this disclosure has employed magnetic disk drives for explanatory purposes, the invention is nonetheless applicable to other storage systems where MR heads are employed, such as magnetic tape systems.

What is claimed is:

1. A method for removing protrusions on a surface of a data storage disk, comprising the steps of:

detecting a protrusion from a substantially flat surface of the data storage disk, said disk including a plurality of tracks one of which contains the protrusion; and in response to detection of the protrusion, performing steps comprising:

positioning a magnetoresistive head over the track containing the protrusion, the head including relatively harder material than the protrusion and further including a read element having a magnetoresistive stripe; and increasing read bias current applied to the magnetoresistive stripe so as to reduce a flying height of the head sufficient to cause the head to contact the protrusion.

2. The method of claim 1, the step of increasing read bias current comprising the step of increasing read bias current until the head has a decreased flying height relative to the disk, said flying height being sufficiently small to position the head away from the disk surface while ensuring contact with the protrusion.

3. The method of claim 1, further comprising the step of rotating the disk sufficiently to reduce a height of the protrusion through abrasive contact between the head and the protrusion.

4. The method of claim 3, the rotating step comprising rotating the disk multiple times, the protrusion and the head abrasively contacting each other during at least one of said rotations.

5. The method of claim 3, the rotating step comprising rotating the disk through multiple rotations, the method further comprising the step of, during rotation of the disk and increasing of the read bias current, repeatedly shifting the head laterally with respect to the track containing the protrusion.

6. The method of claim 1, the detecting step comprising a step of identifying a thermal asperity in a signal representing user data read from the disk.

7. The method of claim 1, the detecting step comprising a step of identifying a thermal asperity in a signal representing servo data read from the disk.

8. The method of claim 1, the detecting step comprising a step of identifying a thermal asperity in an output signal created by reading data from the disk by applying predetermined criteria to the output signal.

9. The method of claim 1, the head being mounted to an actuator, the positioning step comprising steps of pivotally moving the actuator arm to align the head with the track containing the protrusion.

10. The method of claim 1, the head including a write component, the method further comprising the step of during increasing of the read bias current, applying a predetermined level of current to the write component.

11. A method for removing surface irregularities on a data storage disk, comprising the steps of:
  detecting a surface irregularity on a substantially flat surface of the data storage disk, said disk including a plurality of tracks one of which contains the irregularity; and
  in response to detection of the irregularity, performing steps comprising:
    positioning a data access head over the track containing the irregularity, the head including relatively harder material than the surface irregularity; and
    increasing temperature of the head so as to reduce a flying height of the head sufficient to cause the head to contact the irregularity.

12. The method of claim 11, the head including a magnetoresistive stripe, the step of increasing temperature of the head being performed by increasing read bias current applied to the magnetoresistive stripe.

13. The method of claim 11, the head including a write element, the step of increasing temperature of the head being performed by increasing write current applied to the write element.

14. The method of claim 11, the head including a heater element, the step of increasing temperature of the head being performed by activating the heater element.

15. The method of claim 11, the step of increasing temperature of the head comprising the step of increasing temperature of the head until the head has a decreased flying height relative to the disk, the flying height being sufficiently small to position the head away from the disk surface while ensuring contact with the irregularity.

16. A programmed product comprising signal-bearing media embodying a program of machine-readable instructions executable by a digital processing apparatus to perform method steps for removing protrusions on a surface of a data storage disk, said method steps comprising:
  detecting a protrusion from a substantially flat surface of the data storage disk, said disk including a plurality of tracks one of which contains the protrusion; and
  in response to detection of the protrusion, performing steps comprising:
    positioning a magnetoresistive head over the track containing the protrusion, the head including relatively harder material than the protrusion and further including a read element having a magnetoresistive stripe; and
    increasing read bias current applied to the magnetoresistive stripe so as to reduce a flying height of the head sufficient to cause the head to contact the protrusion.

17. The programmed product of claim 16, the step of increasing read bias current comprising the step of increasing read bias current until the head has a decreased flying height relative to the disk, said flying height being sufficiently small to position the head away from the disk surface while ensuring contact with the protrusion.

18. The programmed product of claim 16, further comprising the step of rotating the disk sufficiently to reduce a height of the protrusion from the disk surface through abrasive contact between the head and the protrusion.

19. The programmed product of claim 18, the rotating step comprising the steps of rotating the disk multiple times.

20. The programmed product of claim 18, the rotating step comprising rotating the disk multiple times, the protrusion and the head abrasively contacting each other during at least one of said rotations.

21. The programmed product of claim 18, the rotating step comprising rotating the disk through multiple rotations, the method steps further comprising the step of, during rotation of the disk and increasing of the read bias current, repeatedly shifting the head laterally with respect to the track containing the protrusion.

22. The programmed product of claim 16, the detecting step comprising a step of identifying a thermal asperity in a signal representing user data read from the disk.

23. The programmed product of claim 16, the detecting step comprising a step of identifying a thermal asperity in a signal representing servo data read from the disk.

24. The programmed product of claim 16, the detecting step comprising a step of identifying a thermal asperity in an output signal created by reading data from the disk by applying predetermined criteria to the output signal.

25. The programmed product of claim 16, the head being mounted to an actuator, the positioning step comprising steps of pivotally moving the actuator arm to align the head with the track containing the protrusion.

26. The programmed product of claim 16, the head including a write component, the method steps further comprising the step of, during increasing of the read bias current, applying a predetermined level of current to the write component.

27. A programmed product comprising signal-bearing medium tangibly embodying a program of machine readable instructions executable by a digital processing apparatus to perform method steps for removing surface irregularities from a data storage disk, said method steps comprising:

detecting a surface irregularity on a substantially flat surface of the data storage disk, said disk including a plurality of tracks one of which contains the irregularity; and in response to detection of the irregularity, performing steps comprising:

positioning a data access head over the track containing the irregularity, the head including relatively harder material than the surface irregularity; and increasing temperature of the head so as to reduce a flying height of the head sufficient to cause the head to contact the irregularity.

28. The programmed product of claim 27, the head including a magnetoresistive stripe, the step of increasing temperature of the head being performed by increasing read bias current applied to the magnetoresistive stripe.

29. The programmed product of claim 27, the head including a write element, the step of increasing temperature of the head being performed by increasing write current applied to the write element.

30. The programmed product of claim 27, the head including a heater element, the step of increasing temperature of the head being performed by activating the heater element.

31. The programmed product of claim 27, the step of increasing temperature of the head comprising the step of increasing temperature of the head until the head has a decreased flying height relative to the disk, the flying height being sufficiently small to position the head away from the disk surface while ensuring contact with the irregularity.

32. A data storage apparatus, comprising:

a data storage disk having a substantially flat disk surface;

a head actuator assembly including an actuator arm with a magnetoresistive head mounted thereto, said head including a magnetoresistive stripe to read data from the disk surface; and a control unit, coupled to the head actuator assembly, and programmed to perform method steps to remove protrusions on the disk surface, said method steps comprising:

detecting a protrusion from the substantially flat disk surface, said disk including a plurality of tracks one of which contains the protrusion; and in response to detection of the protrusion, performing steps comprising:

positioning the magnetoresistive head over the track containing the protrusion, the head including relatively harder material than the protrusion; and increasing read bias current applied to the magnetoresistive stripe so as to reduce a flying height of the head sufficient to cause the head to contact the protrusion.

33. The apparatus of claim 32, the step of increasing read bias current comprising the step of increasing read bias current until the head has a decreased flying height relative to the disk, said flying height being sufficiently small to position the head away from the disk surface while ensuring contact with the protrusion.

34. The apparatus of claim 33, further comprising the step of rotating the disk sufficiently to reduce a height of the protrusion from the disk surface through abrasive contact between the head and the protrusion.

35. The apparatus of claim 34, the rotating step comprising rotating the disk multiple times, the protrusion and the head abrasively contacting each other during at least one of said rotations.

36. The apparatus of claim 34, the rotating step comprising rotating the disk through multiple rotations, the method steps further comprising the step of, during rotation of the disk and increasing of the read bias current, repeatedly shifting the head laterally with respect to the track containing the protrusion.

37. The apparatus of claim 32, the detecting step comprising a step of identifying a thermal asperity in a signal representing user data read from the disk.

38. The apparatus of claim 32, the detecting step comprising a step of identifying a thermal asperity in a signal representing servo data read from the disk.

39. The apparatus of claim 32, the detecting step comprising a step of identifying a thermal asperity in an output signal created by reading data from the disk by applying predetermined criteria to the output signal.

40. The apparatus of claim 39, the output signal corresponding to user data stored on the disk.

41. The apparatus of claim 39, the output signal corresponding to servo data stored on the disk.

42. The apparatus of claim 32, the rotating step comprising the steps of rotating the disk multiple times.

43. The apparatus of claim 32, the disk surface having multiple protrusions.

44. The apparatus of claim 32, the protrusion comprising a contaminant foreign to the disk.

45. The apparatus of claim 44, the contaminant comprising dust.

46. The apparatus of claim 32, the head being mounted to an actuator, the positioning step comprising steps of pivotally moving the actuator arm to align the head with the track containing the protrusion.

47. The apparatus of claim 32, the head including a write component, the method steps further comprising the step of, during increasing of the read bias current, applying a predetermined level of current to the write component.

48. A data storage apparatus, comprising:

a data storage disk having a substantially flat disk surface;

a head actuator assembly including an actuator arm with a magnetoresistive head mounted thereto, said head including a magnetoresistive stripe to read data from the disk surface; and a control unit, coupled to the head actuator assembly, and programmed to perform method steps to remove surface irregularities on the disk, said method steps comprising:

detecting a surface irregularity on the substantially flat disk surface, said disk including a plurality of tracks one of which contains the irregularity; and in response to detection of the irregularity, performing steps comprising:

positioning a data access head over the track containing the irregularity, the head including relatively harder material than the surface irregularity; and increasing temperature of the head so as to reduce a flying height of the head sufficient to cause the head to contact the irregularity.

49. The apparatus of claim 48, the step of increasing temperature of the head being performed by increasing read bias current applied to the magnetoresistive stripe.

50. The apparatus of claim 48, the head including a write element, the step of increasing temperature of the head being performed by increasing write current applied to the write element.

51. The apparatus of claim 48, the head including a heater element, the step of increasing temperature of the head being performed by activating the heater element.

52. The apparatus of claim 48, the step of increasing temperature of the head comprising the step of increasing temperature of the head until the head has a decreased flying height relative to the disk, the flying height being sufficiently small to position the head away from the disk surface while ensuring contact with the irregularity.

53. The apparatus of claim 48, the irregularity comprising a contaminant foreign to the disk.

54. The apparatus of claim 48, the irregularity being part of the disk.

* * * * *